(12) United States Patent
Pitz et al.

(10) Patent No.: US 6,360,082 B1
(45) Date of Patent: Mar. 19, 2002

(54) RADIO RECEIVER

(75) Inventors: Gerhard Pitz; Thomas Mader; Gerhard Kottschlag, all of Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,102

(22) PCT Filed: Oct. 16, 1997

(86) PCT No.: PCT/DE97/02373

§ 371 Date: Jun. 29, 1999

§ 102(e) Date: Jun. 29, 1999

(87) PCT Pub. No.: WO98/18654

PCT Pub. Date: May 7, 1998

(30) Foreign Application Priority Data

Oct. 26, 1996 (DE) .................................... 196 44 648

(51) Int. Cl.$^7$ ............................. H04B 1/38; H01Q 1/32
(52) U.S. Cl. ..................... 455/90; 455/345; 455/575; 455/344; 343/713; 343/702
(58) Field of Search .................... 455/345, 90, 575, 455/344, 351, 569; 343/711, 713, 702, 872, 96; 379/428, 437

(56) References Cited

U.S. PATENT DOCUMENTS

| 5,202,913 | A | * | 4/1993 | Lang et al. | 379/58 |
| 5,418,836 | A | * | 5/1995 | Yazaki | 379/58 |
| 5,797,088 | A | * | 8/1998 | Stamegna | 455/345 |
| 6,131,042 | A | * | 10/2000 | Lee et al. | 455/556 |
| 6,150,985 | A | * | 11/2000 | Pritchard | 343/713 |

FOREIGN PATENT DOCUMENTS

DE 196 13 879 A1 10/1997

\* cited by examiner

*Primary Examiner*—Daniel Hunter
*Assistant Examiner*—Lana Le
(74) *Attorney, Agent, or Firm*—Michael J. Striiker

(57) ABSTRACT

A radio receiver (1), in particular a car radio, is proposed, which is used for a space-saving feed-in of an antenna cable (15). A radio telephone (30) is integrated into the radio receiver (1). An antenna connector (5) is provided on a rear or lateral wall (10) of the housing of the radio receiver (1). The antenna connector (5) for the antenna cable (15) extends in a parallel direction or a narrow angle in respect to the rear or lateral wall (10) of the housing. The antenna connector (5) is arranged in a bulge (45) of the rear or lateral wall (10) of the housing.

5 Claims, 2 Drawing Sheets

RADIO RECEIVER

PRIOR ART

Figure 1:
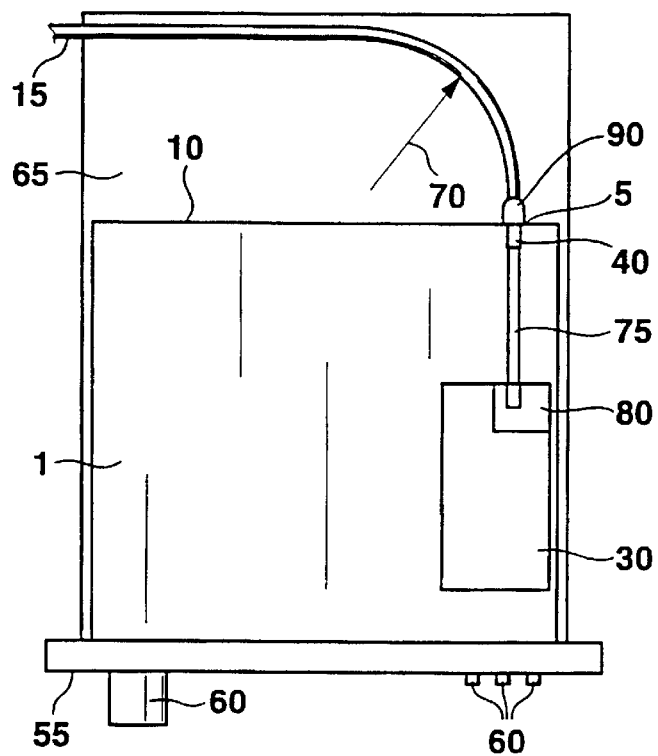

The invention is based on a radio receiver in accordance with the species of the main claim. A radio receiver with an integrated telephone arrangement for use in a motor vehicle is already known from the not previously published German patent application 196 13 879. In the customary manner, the radio receiver has an antenna connector on one of its housing walls for feeding an antenna cable in.

ADVANTAGES OF THE INVENTION

In contrast thereto, the radio receiver with the characteristics of the main claim has the advantage that the antenna connector for feeding an antenna cable in extends in the parallel direction or at a narrow angle in respect to the rear or lateral wall of the housing and is arranged in a bulge of the rear or lateral wall of the housing. A space-saving feeding of the antenna cable to the housing of the radio receiver is made possible in this way, however, permissible bending radii of the antenna cables in respect to the housing wall must be observed, in particular with vertical feeding of the antenna cable. This space saving has a particular effect when the radio is used as a car radio, since in comparison with a vertical feeding of the antenna cable, the usable space for the car radio in the installation chute can be considerably enlarged when the antenna cable is fed in parallel, so that the installation of cassette and/or CD drives, for example, is subjected to fewer space restrictions.

These space savings must be considered to be particularly advantageous if the antenna connector for the radio telephone already has a comparably large volume. In this case the usable space is not further reduced by the feed of the antenna cable.

Advantageous further embodiments and improvements of the radio receiver recited in the main claim are possible by the steps listed in the dependent claims.

A rotatable antenna connector is particularly advantageous. A flexible access of the antenna cable to the antenna connector, which is matched to the spatial conditions, is made possible in this way.

It is also advantageous that, at the location of the antenna connector, the housing of the radio receiver has a projection in relation to the rear or lateral wall of the housing, in which the antenna connector is placed. In this way the antenna connector is better protected against environmental effects.

Moreover, the mounting of the antenna connector on a board of the radio receiver is advantageous. The production of the radio receiver is simplified in this way, since the mounting of the antenna connector can already take place in one work step, together with equipping the board. Costs are furthermore reduced by means of this.

The connection of the antenna connector with the radio telephone and a receiver element of the radio by means of an antenna diplexer is advantageous. In this way only a single antenna connection is required for the operation of the telephone and radio reception, so that space, outlay, material and costs are saved in connection with the production.

DRAWINGS

Exemplary embodiments of the invention are represented in the drawings and will be explained in greater detail in the following description.

Figure 2:
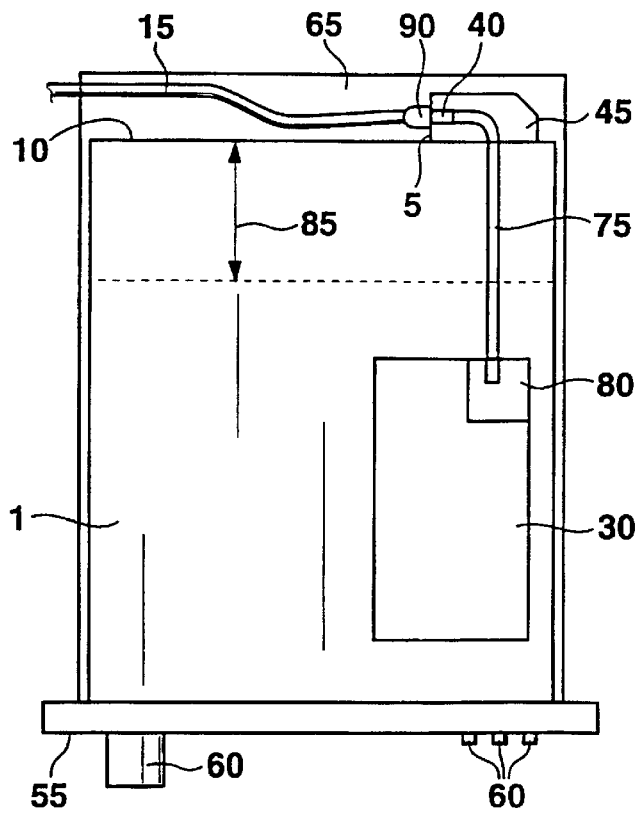
Figure 3:
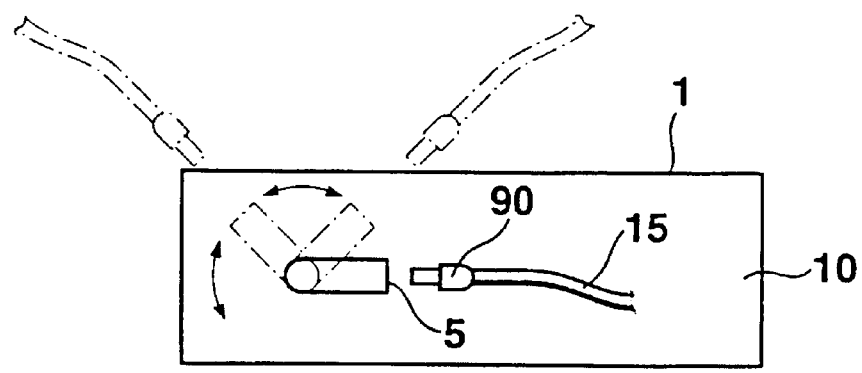
Figure 4:
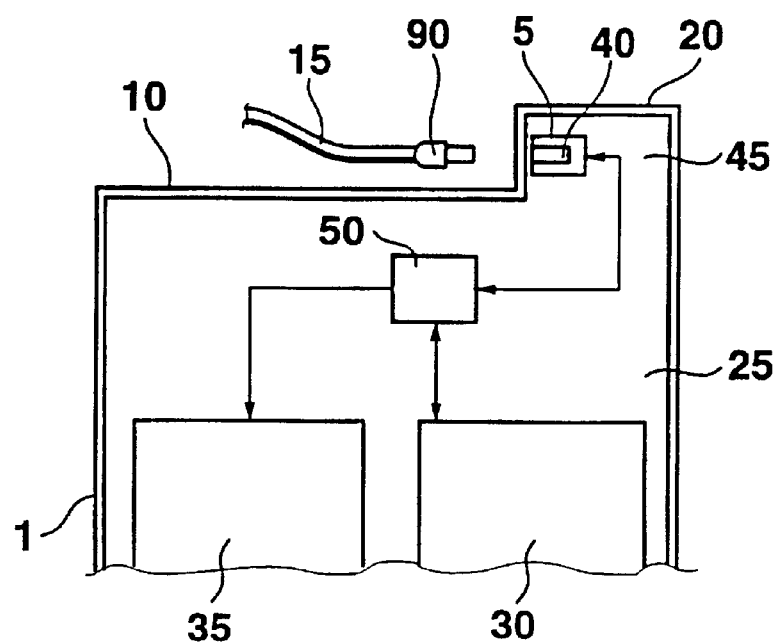

FIG. 1 shows a radio receiver with a vertical antenna cable feed in accordance with the prior art, FIG. 2 a radio receiver with a parallel antenna cable feed, FIG. 3 a rotatable antenna connector and FIG. 4 an antenna connector integrated in the housing of the radio receiver.

DESCRIPTION OF THE EXEMPLARY EMBODIMENT

A radio receiver, designed as a car radio and having a control front 55 with control elements 65, is identified by 1 in FIG. 1. The radio receiver 1 is housed in an installation chute 65. The installation chute 65 is covered by the control front 55, which is accessible from the outside. An antenna connector 5 is attached to a rear housing wall 10 of the radio receiver. 1, which has a jack 40 extending vertically in respect to the rear housing wall 10 for feeding an antenna cable 15. A plug connector can also be provided in place of the jack 40. The antenna cable 15 is fed to the jack 40 vertically in respect to the rear housing wall 10 and is bent into a quarter circle over a bending radius 70, so that the antenna cable 15 leaves the installation chute 65 parallel with the rear housing wall 10. By means of a connecting cable 75, this jack 40 is connected inside the radio receiver 1 with a connector jack 80 of a radio telephone 30 integrated into the radio receiver 1. Here, the connector jack 80 can be soldered on a board of the radio telephone 30. A stress relief is provided by means of the connection of the antenna connector 5 with the connector jack 80 of the radio telephone 30 via a connecting cable 75, so that at the end of production the connector jack 80 is no longer mechanically stressed. The connection of the antenna cable 15 to the antenna connector 5 is made by the introduction of the plug 90 of the antenna cable 15 into the jack 40 of the antenna connector 5.

The representation in accordance with FIG. 1 constitutes a conventional realization of the antenna cable feed in connection with a car radio placed into an installation chute 65. In FIG. 2, for the feeding of the antenna cable 15, the antenna connector 5 of the radio receiver 1 is equipped with a jack 40, which extends in a parallel direction in respect to the rear housing wall 10. Here, the antenna connector 5 is located in a bulge 45 of the rear housing wall 10. In this case the bulge 45 can also be embodied as an angle element attached to the rear housing wall 10. Thus, the antenna cable 15 can be fed to the antenna connector 5 parallel with the rear housing wall 10, so that with the same dimensions of the installation chute 65 as in FIG. 1, the space identified by the two-headed arrow with the reference numeral 85 is gained in the insertion direction, which corresponds to the bending radius 70 and makes possible a corresponding increase in the housing volume of the radio receiver 1, as represented in FIG. 2. In this way it is possible to install the drives for cassette and/or CD operation in the radio receiver 1 in a simpler way, since the usable space in the installation chute 65 is larger. The parallel feeding of the antenna cable 15 to the antenna connector 5 requires the quarter-circle bending of the connecting cable 75, so that the latter is accessible in the housing of the radio receiver 1 and can be connected to the connecting jack 80 of the radio telephone 30. In this way the bending of the antenna cable feed is displaced into the interior of the housing of the radio receiver 1, so that the described gain in space results. Moreover, bending of the connecting cable 75 is less critical than bending the antenna cable 15, because the connecting cable 75 is thinner and more flexible.

In a further exemplary embodiment in accordance with FIG. 3, the antenna connector 5 is rotatably connected with the rear housing wall 10. In this case any arbitrary rotary positions can be set, which is represented by the two two-headed arrows in FIG. 3. Since the axis of rotation extends perpendicular in relation to the rear housing wall 10, the feed of the antenna connector 5 always takes place parallel with the rear housing wall 10. The antenna cable feed can be matched to the spatial conditions of the radio receiver 1 in the installation chute 65, or another installation device, by setting the rotary position of the antenna connector 10.

A further exemplary embodiment is represented in FIG. 4. Here, the housing of the radio receiver 1 has a projection 20 in respect to the rear housing wall 10 at the location of the antenna connector 5, which constitutes the bulge 45 in the rear housing wall 10 necessary for placing the antenna connector 5. In this case the antenna connector 5 with its jack 40 is mounted on a board 25 of the radio receiver 1. Furthermore, the modules of the radio telephone 30 as well as the components of a radio receiver element 35 are mounted on the board 25 of the radio receiver 1. The radio receiver element 35 and the radio telephone 30 are connected with the antenna connector 5 via an antenna diplexer 50, so that the antenna connector 5 can be used for radio reception as well as for the transmitting and receiving operations of the radio telephone 30, In place of the antenna diplexer it is also possible to use an antenna switch.

In connection with further exemplary embodiments, not represented, it is also possible to provide the antenna connector in a manner in accordance with the invention on a lateral wall of the radio receiver 1 instead of the rear housing wall 10. Furthermore, a feed of the antenna cable 15 at a small, preferably acute angle in respect to the corresponding housing wall can also take place instead of the parallel antenna cable feed wherein, however, a smaller gain in space is possible in comparison with the parallel antenna cable feed. Placing the antenna connector 5 on a lateral wall of the housing of the radio receiver 1 depends on the spatial conditions of the installation chute 65, or respectively the installation location of the radio receiver 1.

What is claimed is:

1. A radio receiver (1), in particular a-car radio, into which a radio telephone (30) is integrated, having an antenna connector (5) on a rear or lateral wall (10) of the radio receiver (1), characterized in that the antenna connector (5) for feeding an antenna cable (15) in extends in the parallel direction or at a narrow angle in respect to the rear or lateral wall (10) of the housing and is arranged in a bulge (45) of the rear or lateral wall (10) of the housing.

2. The radio receiver in accordance with claim 1, characterized in that the antenna connector (5) is rotatable.

3. The radio receiver in accordance with claim 1, characterized in that at the location of the antenna connector (5), the housing of the radio receiver (1) has a projection (20) in relation to the rear or lateral wall (10) of the housing, in which the antenna connector (5) is placed.

4. The radio receiver in accordance with claim 1, characterized in that the antenna connector (5) is mounted on a board (25) of the radio receiver (1).

5. The radio receiver in accordance with claim 1, characterized in that the antenna connector (5) is connected with the radio telephone (30) and a receiver element (35) of the radio by means of an antenna diplexer or an antenna switch (50).

* * * * *